us007388040B2

United States Patent
Sader et al.

(10) Patent No.: US 7,388,040 B2
(45) Date of Patent: Jun. 17, 2008

(54) ANTI-KOGATION ADDITIVES COMPATIBLE WITH CATIONIC POLYMERS FOR FIXER-BASED PRINTING SYSTEMS

(75) Inventors: Richard A. Sader, Yakima, WA (US); Mark L. Choy, San Diego, CA (US); Yi-Hua Tsao, San Diego, CA (US); Paul J. Bruinsma, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/820,612

(22) Filed: Apr. 8, 2004

(65) Prior Publication Data

US 2005/0225615 A1    Oct. 13, 2005

(51) Int. Cl.
C09D 11/10 (2006.01)
C08K 5/52 (2006.01)
B05D 3/10 (2006.01)

(52) U.S. Cl. .................. 523/160; 523/161; 524/140; 427/340

(58) Field of Classification Search .......... 523/160, 523/161; 524/140
See application file for complete search history.

(56) References Cited

U.S. PATENT DOCUMENTS

| | | | | |
|---|---|---|---|---|
| 4,176,107 | A * | 11/1979 | Buckman et al. ............ | 524/317 |
| 4,579,591 | A | 4/1986 | Suzuki et al. | |
| 5,062,892 | A | 11/1991 | Halko | |
| 5,062,893 | A | 11/1991 | Adamic et al. | |
| 5,614,007 | A | 3/1997 | Kurabayashi et al. | |
| 5,782,967 | A | 7/1998 | Shirota et al. | |
| 6,013,123 | A | 1/2000 | Scarpetti | |
| 6,254,669 | B1 | 7/2001 | Lavery et al. | |
| 6,607,266 | B2 * | 8/2003 | Katsuragi et al. ............ | 347/96 |
| 6,610,129 | B1 | 8/2003 | Sader et al. | |
| 6,749,675 | B2 * | 6/2004 | Momose .................. | 106/31.58 |
| 6,932,466 | B2 | 8/2005 | Payne et al. | |
| 6,988,795 | B2 * | 1/2006 | Doi ............................. | 347/100 |
| 2003/0070581 | A1 | 4/2003 | Tomioka et al. | |
| 2003/0103121 | A1 | 6/2003 | Tomioka et al. | |
| 2004/0055504 | A1 | 3/2004 | Lee et al. | |
| 2004/0063808 | A1 * | 4/2004 | Ma et al. ................ | 523/160 |
| 2004/0206274 | A1 * | 10/2004 | Kruckel ................ | 106/164.4 |
| 2005/0155516 | A1 * | 7/2005 | Hermansky ............. | 106/31.25 |

FOREIGN PATENT DOCUMENTS

| | | |
|---|---|---|
| EP | 0 425 150 A2 | 5/1991 |
| EP | 0 499 425 A1 | 8/1992 |
| EP | 0 712 913 A1 | 5/1996 |
| EP | 1 234 861 A1 | 8/2002 |
| EP | 1231246 | 8/2002 |
| EP | 1 304 364 A1 | 4/2003 |
| JP | S57-36170 | 2/1982 |
| JP | 63-165477 | 7/1988 |
| JP | 5-132643 | 5/1993 |
| JP | 10-279445 | 10/1998 |
| JP | 2001-081374 | 2/2001 |
| JP | 2001-234191 | 8/2001 |
| JP | 2002-371215 | 12/2002 |

* cited by examiner

Primary Examiner—Tae H Yoon

(57) ABSTRACT

A fixer fluid having reduced kogation. The fixer fluid includes at least one phosphate ester surfactant and at least one cationic polymer, wherein the fixer fluid is formulated so that the at least one phosphate ester surfactant does not precipitate with the at least one cationic polymer. The at least one phosphate ester surfactant may be an anionic phosphate ester surfactant or an amphoteric phosphate ester surfactant. If the at least one phosphate ester surfactant is an anionic phosphate ester surfactant, it may have greater than or equal to approximately 2 moles of ethylene oxide per mole of the phosphate ester surfactant. The present invention also relates to an inkjet ink having reduced kogation and a method of producing a fixer fluid having reduced kogation.

18 Claims, 4 Drawing Sheets

ANTI-KOGATION ADDITIVES COMPATIBLE WITH CATIONIC POLYMERS FOR FIXER-BASED PRINTING SYSTEMS

BACKGROUND OF THE INVENTION

The use of inkjet printing systems has grown dramatically in recent years, which is attributed to substantial improvements in print resolution and overall print quality coupled with appreciable reduction in cost. Notwithstanding their recent success, intensive research and development efforts continue toward improving inkjet print quality, while further lowering cost to the consumer.

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. The inkjet ink typically includes one or more colorants dissolved or dispersed in an aqueous-based ink vehicle. Each firing chamber has a resistor element, known as a firing resistor, located opposite the nozzle so that the inkjet ink collects between the firing resistor and the nozzle. Each resistor element is typically a pad of a resistive material and measures about 35 µm×35 µm. The printhead is held and protected by an outer packaging referred to as a print cartridge or an inkjet pen.

Upon energizing of a particular resistor element, a droplet of inkjet ink is expelled through the nozzle toward the print medium. The firing of the inkjet ink droplets is typically under the control of a microprocessor, the signals of which are conveyed by electrical traces to the resistor elements, forming alphanumeric and other characters on the print medium. The small scale of the nozzles, which are typically 10 µm to 40 µm in diameter, require that the inkjet ink not clog the nozzles.

However, repeated firings of the resistor elements, which are designed to withstand millions of firings over the life of the print cartridge, result in fouling of the resistor elements with residue and degradation of pen performance. This build up of residue is known as kogation. The term "kogation" is used herein to refer to the build up of the residue, or koga, on a surface of the resistor element in the inkjet pen. Kogation reduces drop velocity and drop weight and reduces the efficiency of drop ejection. A loss of drop weight over the life of the inkjet pen reduces the chroma or optical density of the inkjet ink on the print medium and, therefore, degrades print quality. A loss of drop weight over the life of the inkjet pen reduces the accuracy of drop placement on the print medium and, therefore, degrades print quality.

Oxyanion additives, such as phosphates, in the inkjet ink have been disclosed to reduce kogation. The oxyanion additive eliminates or reduces adsorption of dye and/or decomposition products onto the resistor element. Short-chain phosphate esters, anionic phosphate ester surfactants, organic acid sulfonate additives (such as sodium methane sulfonate), and bile salt additives (e.g., sodium cholate) have also been disclosed for kogation control. It has also been disclosed that phytic acid in the inkjet ink reduces foreign matter deposits on a surface of an inkjet heating head. Although many solutions for kogation have been, proposed, many of the solutions are limited in their effectiveness, are not economically feasible, or have undesirable side effects for inkjet pens that need long resistor life.

Although kogation typically occurs with dye-based inkjet inks, kogation is also a problem with fixer fluids. As used herein, the term "fixer fluid" refers to a fluid that is substantially devoid of color and includes a reactive component (e.g., a molecule, complex, or a functional group in a molecule, polymer, or complex) that reacts with a component of the inkjet ink. In other words, the fixer fluid includes no colorant, such as a dye or a pigment, or includes a colorant that does not absorb visible light but absorbs in either or both of the infrared ("IR") or ("ultraviolet") UV spectrums.

The reactive component of the fixer fluid typically includes a cationic polymer, which is dissolved in an ink vehicle. When the fixer fluid is printed with an inkjet ink that includes an anionic dye, a printed image having increased waterfastness, smearfastness, smudgefastness or bleed alleviation, improved color vibrancy, improved edge acuity, or reduced dry time is produced. When the fixer fluid and the inkjet ink combine on the print medium, a precipitation reaction occurs which makes the dye durable and waterfast. The precipitation reaction also enhances optical density on certain types of print media, such as coated offset print media.

Many of the additives that have been used to improve the kogation of inkjet inks are not compatible with fixer fluids because the additives are anionic and, therefore, may precipitate with the cationic polymers. The precipitation may be even more pronounced when the additives are anionic surfactants that are incorporated into micelles because their anionic charge becomes concentrated. Therefore, it would be desirable to provide additives that are compatible with the cationic polymers in the fixer fluid to minimize kogation.

BRIEF SUMMARY OF THE INVENTION

The present invention relates to a fixer fluid having reduced kogation that includes at least one phosphate ester surfactant and at least one cationic polymer. The fixer fluid is formulated so that the at least one phosphate ester surfactant does not precipitate with the at least one cationic polymer. The at least one phosphate ester surfactant may include at least one anionic phosphate ester surfactant. The at least one phosphate ester surfactant may be selected from the group consisting of a nonylphenol ethoxylate phosphate ester, a salt of a nonylphenol ethoxylate phosphate ester, an aliphatic phosphate ester, a phosphated nonylphenoxy polyethoxy ethanol, and a salt of ethyl-hexanol ethoxylated phosphate ester.

The at least one phosphate ester surfactant may include greater than or equal to approximately 2 moles of ethylene oxide per mole of the at least one phosphate ester surfactant. The at least one phosphate ester surfactant may be present from approximately 0.01% by weight ("wt %") to approximately 10 wt % of a total weight of the fixer fluid.

The at least one cationic polymer may be present from approximately 0.2 wt % to approximately 10 wt % of a total weight of the fixer fluid. The at least one cationic polymer may be at least one of a polyethylene imine compound, polyallylamine, a quaternized polyamine, a polymer of hexamethylene guanide, a polymer of hexamethylene biguanide, or mixtures thereof.

The present invention also relates to a fixer fluid that includes at least one amphoteric phosphate ester surfactant and at least one cationic polymer. The at least one amphoteric phosphate ester surfactant may include an organo phosphate. The fixer fluid may be formulated so that the at least one amphoteric phosphate ester surfactant does not precipitate with the at least one cationic polymer. The at least one amphoteric phosphate ester surfactant may be present from approximately 0.01% by weight ("wt %") to approximately 10 wt % of a total weight of the fixer fluid. The at least one cationic polymer may be present from approximately 0.2 wt % to approximately 10 wt % of a total weight of the fixer fluid. The at least one cationic polymer may be at least one of a polyethylene imine compound, polyallylamine, a quaternized polyamine, a polymer of hexamethylene guanide, a polymer of hexamethylene biguanide, or mixtures thereof.

The present invention also relates to an inkjet ink having reduced kogation. In a particular embodiment, the inkjet ink includes a colorant and at least one phosphate ester surfactant. The at least one phosphate ester surfactant is at least one anionic phosphate ester surfactant selected from the group consisting of a nonylphenol ethoxylate phosphate ester, a salt of a nonylphenol ethoxylate phosphate ester, an aliphatic phosphate ester, a phosphated nonylphenoxy polyethoxy ethanol, and a salt of ethyl-hexanol ethoxylated phosphate ester. In another embodiment, the at least one phosphate ester surfactant has greater than or equal to approximately 2 moles of ethylene oxide per mole of the at least one phosphate ester surfactant.

The present invention also relates to a method of producing a fixer fluid having reduced kogation. In a particular embodiment, the method includes combining at least one phosphate ester surfactant and at least one cationic polymer in an ink vehicle. The at least one phosphate ester surfactant is selected so that it does not precipitate with the at least one cationic polymer. The at least one phosphate ester surfactant may be at least one anionic phosphate ester surfactant. In another embodiment, the at least one phosphate ester surfactant may be selected from the group consisting of a nonylphenol ethoxylate phosphate ester, a salt of a nonylphenol ethoxylate phosphate ester, an organo phosphate, an aliphatic phosphate ester, a phosphated nonylphenoxy polyethoxy ethanol, and a salt of ethyl-hexanol ethoxylated phosphate ester.

Alternatively, the at least one phosphate ester surfactant may be an amphoteric surfactant, such as an organo phosphate surfactant.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
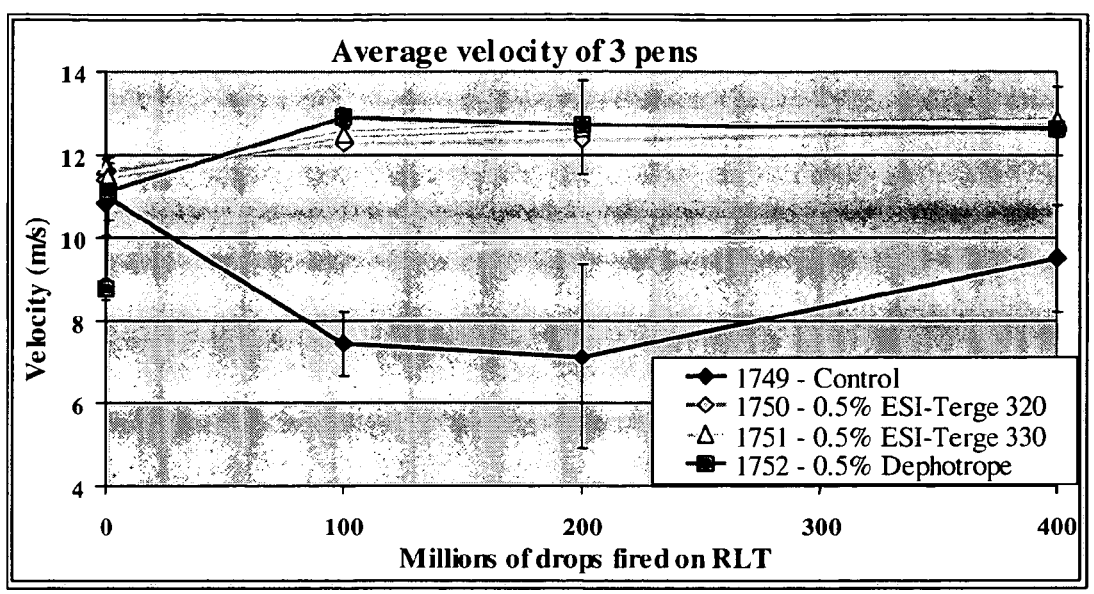
FIGS. 1-5 show improved kogation performance of an embodiment of fixer fluids of the present invention compared to the kogation performance of control fixer fluids.

A fixer fluid including at least one additive that minimizes kogation is disclosed. The anti-kogation additive may be compatible with a cationic polymer in the fixer fluid and may be selected or formulated so that the anti-kogation additive does not precipitate with the cationic polymer. The fixer fluid may be applied to a print medium, in combination with an inkjet ink, to produce a printed image having increased waterfastness, smearfastness, or smudgefastness, improved color vibrancy, improved edge acuity, or reduced dry time.

The anti-kogation additive used in the fixer fluid may be an anionic surfactant, a nonionic surfactant, a zwitterionic surfactant, an amphoteric surfactant, or mixtures thereof. As used herein, the term "amphoteric surfactant" refers to a surfactant that includes both cationic groups and anionic groups. If the amphoteric surfactant is present in an acidic environment, the amphoteric surfactant has cationic groups, while the amphoteric surfactant has anionic groups in a basic environment. At neutral pH, the amphoteric surfactant has an overall neutral charge because both cationic groups and anionic groups are present. As used herein, the term "zwitterionic surfactant" refers to a surfactant that includes both anionic groups and cationic groups and, therefore, has a neutral charge. The zwitterionic surfactant differs from the amphoteric surfactant in that the charge on the zwitterionic surfactant is not sensitive to changes in pH. In one embodiment, the anti-kogation additive is an anionic surfactant. In another embodiment, the anti-kogation additive has a neutral charge. As such, the anti-kogation additive may be nonionic, amphoteric, or zwitterionic. The fixer fluid may have a pH ranging from approximately 2 to approximately 10. In one embodiment, the fixer fluid has a neutral pH so that the anti-kogation additive has an overall neutral charge.

The anti-kogation additive may be a phosphate surfactant, such as a phosphate ester surfactant. Examples of phosphate ester surfactants include, but are not limited to, surfactants that are commercially available under the Emphos®, DeSophoS™, Hostaphat®, ESI-Terge®, Emulgen®, Crodafos™, Dephotrope™, and DePHOS™ tradenames, which are available from Witco Corp. (Middlebury, Conn.), Witco Corp. (Middlebury, Conn.), Clariant GmbH (Frankfurt, Germany), Cook Composites and Polymers Co., (Kansas City, Mo.), Kao Specialties Americas LLC (High Point, Nalco), Croda Inc. (Parsippay, N.J.), DeForest Enterprises, Inc. (Boca Raton, Fla.), and DeForest Enterprises, Inc. (Boca Raton, Fla.), respectively.

Specific examples of anionic, nonionic, and amphoteric phosphate ester surfactants that may be used include, but are not limited to, Crodafos™ N-3 Acid, Emphos® 9NP, Emphos® CS121, Emphos® CS131, Emphos® CS141, Emphos® CS1361, Hostaphat® LPKN, ESI-Terge® 320, ESI-Terge® 330, DePhoS™ 8028, Emulgen® BL-2PK, DeSophos™ 4P, DeSophos™ 6DNP, DeSophoS™ 6MPNa, DeSophos™ 6NPNa, DeSophoS™ 8DNP, DeSophoS™ 9NP, DeSophoS™ 10TP, DeSophoS™ 14DNP, DeSophoS™ 30NP, or Dephotrope™ CAS-MF. In addition, mixtures of these phosphate ester surfactants may be used. The phosphate ester surfactant may be oleth-3 phosphate, a nonylphenol ethoxylate phosphate ester, a salt of a nonylphenol ethoxylate phosphate ester, an organo phosphate, an aliphatic phosphate ester, a phosphated nonylphenoxy polyethoxy ethanol, or a salt of ethyl-hexanol ethoxylated phosphate ester ("2EH-2EO"). In one embodiment, the phosphate ester surfactant is Dephotrope™ CAS-MF. In another embodiment, the phosphate ester surfactant is Emphos® 9NP, Emphos® CS121, Emphos® CS131, Emphos® CS141, Emphos® CS1361, ESI-Terge® 320, or ESI-Terge® 330.

If the anti-kogation additive is an anionic phosphate ester surfactant, the phosphate ester surfactant may include at least one mole of ethylene oxide ("EO") per mole of the anti-kogation additive. In one embodiment, the anti-kogation additive has greater than 4 moles of EO per mole of the anti-kogation additive. In another embodiment, the anti-kogation additive has greater than or equal to approximately 2 moles of EO per mole of the anti-kogation additive. Without being bound to a particular theory, it is believed that solubilizing groups in the anti-kogation additive, such as the EO groups, prevent the precipitation reaction of the reactive component with the fixer fluid. As such, it is believed that by formulating the anti-kogation additive to have sufficient solubilizing EO groups, the fixer fluid may be stable against precipitation and may have minimum kogation.

The anti-kogation additive may be present from approximately 0.01% by weight ("wt %") to approximately 10 wt % of a total weight of the fixer fluid. In one embodiment, the phosphate ester surfactant is present from approximately 0.2% wt %" to approximately 1 wt %. In another embodiment, the phosphate ester surfactant is present from approximately 0.4 wt % to approximately 1 wt %.

The fixer fluid may also include a cationic polymer or a mixture of cationic polymers in an ink vehicle. The fixer fluid may also include at least one cationic surfactant or a mixture of at least one cationic polymer and at least one cationic surfactant instead of the cationic polymer. The cationic polymer may be present in the fixer fluid from approximately 0.2 wt % to approximately 10 wt %. The cationic polymer may be a polyamine compound including, but not limited to, a polyethylene imine ("PEI") compound, polyallylamine, or other quaternized polyamines. In one embodiment, the cationic polymer is LupOSOI™ FG, which is available from BASF Corp. (Mount Olive, N.J.). The cationic polymer may also be a polyguanidine compound, such as a polymer of hexamethylene guanide ("HMG") or a polymer of hexamethylene biguanide ("HMB"). In one embodiment, the cationic polymer is a polyguanidine compound, such as Vantocil® IB, which is available from Avecia Inc. (Wilmington, Del.).

The ink vehicle may include water, at least one organic solvent, or mixtures thereof. The organic solvent may include, but is not limited to, alkyl alcohols having 1 to 8 carbons (e.g., methyl alcohol, ethyl alcohol, n-propyl alcohol, isopropyl alcohol, n-butyl alcohol, sec-butyl alcohol, tert-butyl alcohol, isobutyl alcohol, and n-pentanol), amides (e.g., dimethylformamide and dimethylacetamide), ketones or keto-alcohols (e.g., acetone and diacetone alcohol), ethers (e.g., tetrahydrofuran and dioxane), oxyethylene or oxypropylene copolymers (e.g., diethylene glycol, triethylene glycol, tetraethylene glycol, dipropylene glycol, tripropylene glycol, polyethylene glycol, and polypropylene glycol), alkylene glycols in which the alkylene group has 2 to 8 carbon atoms (e.g., ethylene glycol, propylene glycol, trimethylene glycol, triethylene glycol and 1,2,6-hexane triol), glycerin, trimethylolethane and trimethylolpropane; lower alkyl ethers (e.g., ethylene glycol monomethyl (or ethyl) ether, diethylene glycol monomethyl (or ethyl) ether, and triethylene glycol monomethyl (or ethyl) ether), lower dialkyl ethers of polyhydric alcohol (e.g., triethylene glycol dimethyl (or ethyl) ether and tetraethylene glycol dimethyl (or ethyl) ether), alkanolamines (e.g., monoethanolamine, diethanolamine, and triethanolamine), sulfolane, N-methyl-2-pyrrolidone, 2-pyrrolidone, 1,3-dimethyl-2-imidazolidinone, or mixtures thereof.

The fixer fluid may optionally include at least one of a viscosity modifier, a pH adjusting agent, a metal chelator, a fungicide, a preservative, an antioxidant, or a binder depending on the desired properties of the fixer fluid. These optional ingredients may be selected by one of ordinary skill in the art from known materials and, therefore, are not discussed in detail herein.

The fixer fluid may be produced by combining or mixing the anti-kogation additive, the cationic polymer, and, if present, any optional ingredients with the ink vehicle. The pH of the fixer fluid may be adjusted to a desired level by adding a mineral acid, an organic acid, a mineral base, or an organic base. Techniques for producing the fixer fluid are known in the art and, therefore, are not discussed in detail herein.

The fixer fluid of the present invention may be applied to the print medium along with an inkjet ink that includes a dye, a pigment, or mixtures thereof as the colorant. In one embodiment, the inkjet ink includes an anionic dye. Anionic dye-based inkjet inks and techniques for producing these inkjet inks are known in the art and are not described in detail herein. Techniques for applying the inkjet ink and the fixer fluid to the print medium are also known in the art and are not described in detail herein. The inkjet ink and the fixer fluid may be applied to the print medium using a conventional inkjet printer, such as a DeskJet® printer available from Hewlett-Packard Co. (Palo Alto, Calif.). The fixer fluid may be overprinted or underprinted onto the print medium relative to the inkjet ink. In one embodiment, the fixer fluid is overprinted relative to the inkjet ink.

After printing, the resistor surfaces may be visually inspected with an optical microscope to determine whether koga is present. In addition, drop velocities may be determined by methods known in the art.

If the anionic dye in the inkjet ink is sensitive to acid, the fixer fluid may optionally include an acidic buffer to increase precipitation of the anionic dye. The acidic buffer may increase precipitation of the anionic dye, especially when printed with an inkjet ink that includes an acid-sensitive anionic dye or a combination of an anionic dye and a pigment stabilized with anionic groups that are acid sensitive. When applied to the print medium, the acidic buffer may help to quickly precipitate the acid-sensitive dye or pigment, stratifying the colorant on top of the media and enhancing optical density. The reactive component in the fixer fluid may make the dye durable and waterfast.

The acidic buffer may be a mineral acid or an organic acid, such as succinic acid, glutaric acid, tris(hydroxymethyl)aminomethane, 4-morpholineethanesulfonic acid, 4-morpholinepropanesulfonic acid, methylsuccinic acid, malonic acid, glycolic acid, diglycolic, 2-ethyl-2-methylsuccinic acid, 2,2-bis(hydroxymethyl)propionic acid, tartaric acid, citric acid, itaconic acid, maleic acid, beta-alanine, or 4-aminobutyric acid. The acidic buffer may be present in the fixer fluid from approximately 0 wt % to approximately 10% wt %. In one embodiment, the acidic buffer is present from approximately 0.1 wt % to approximately 7 wt %. In one embodiment, the acidic buffer is succinic acid and may be at least partially neutralized to a pH of 4 with sodium hydroxide.

The print medium upon which the fixer fluid and the inkjet ink are applied may be a conventional print medium for use in inkjet printing, such as a plain paper or a specialty paper. The print medium may be a coated paper, a coated offset print medium, or a transparency coated with an ink-receiving layer, as known in the art. Examples of print media that may be used include, but are not limited to Hammermill® Bond paper, produced by International Paper Co. (Stamford, Conn.), Lustro™ Laser gloss (available from S. D. Warren), and HP Premium Inkjet Transparency Film (available from Hewlett-Packard Co.).

Without being tied to a particular theory, it is believed that when the fixer fluid is ejected from the inkjet pen, the anti-kogation additive chemically binds with a metal or metal oxide surface of the resistor element. For instance, the phosphate ester surfactant may chemically bind to a tantalum surface of the resistor element. The bound phosphate ester surfactant may form a layer on the resistor element, minimizing buildup of residue, such as other organic materials, on the surface of the resistor element. The phosphate ester surfactant may also minimize precipitation reactions on the print medium that may affect print quality and durability of the printed image.

The phosphate ester surfactant may also be used in the inkjet ink to reduce kogation of the inkjet ink. The inkjet ink having the phosphate ester surfactant may be used with a fixer fluid that includes the cationic polymer or with a fixer fluid that includes the cationic polymer and the phosphate ester surfactant. The phosphate ester surfactant in the inkjet ink may be an anionic surfactant, a nonionic surfactant, a zwitterionic surfactant, or an amphoteric surfactant, as previously described. For instance, Dephotrope™ CAS-MF may be used in the inkjet ink.

The phosphate ester surfactant may be present in the inkjet ink from approximately 0.1 wt % to approximately 3 wt % of a total weight of the inkjet ink composition. In one embodiment, the phosphate ester surfactant is present from approximately 0.2 wt % to approximately 0.5 wt % of the inkjet ink composition. In another embodiment, the phosphate ester surfactant is present from approximately 0.5 wt % to approximately 3 wt % of the inkjet ink composition. The phosphate ester surfactant may be used in a dye-based or pigment-based inkjet ink. Dye-based and pigment-based inkjet inks are known in the art and, therefore, are not discussed in detail herein. In one embodiment, the inkjet ink is a dye-based inkjet ink.

The inkjet ink may include a dye, a pigment, or mixtures thereof as the colorant, which is dissolved or dispersed in an aqueous ink vehicle. The ink vehicle may include water or a mixture of water and water-soluble or water-miscible organic solvents. The inkjet ink may optionally include at least one of a viscosity modifier, a pH adjusting agent, a metal chelator, a fungicide, a preservative, an antioxidant, or a binder, depending on the desired properties of the inkjet ink. These optional ingredients may be selected by one of ordinary skill in the art and are not described herein.

Without being tied to a particular theory, it is believed that the phosphate ester surfactant in the inkjet ink may help to mediate precipitation reactions on the print medium that affect print quality and durability of the printed image. The phosphate ester surfactant in the inkjet ink may also improve print quality and dot gain of the printed image. In addition, by using the phosphate ester surfactant in the inkjet ink, a reduced amount of the fixer fluid may be used to print the desired image or a lower concentration of the cationic polymer in the fixer fluid may be used.

The following examples serve to explain embodiments of the present invention in more detail. These examples are not to be construed as being exhaustive or exclusive as to the scope of this invention.

EXAMPLES

Example 1

Kogation Performance of Fixer Fluids Including Dephotrope™ CAS-MF

Fixer fluids having 4% or 2.5% of Vantocil® IB and 0.5% Dephotrope™ CAS-MF were prepared. Control fixer fluids having 4% or 2.5% of Vantocil® IB were also prepared. The kogation performance of each of these fixer fluids was determined by measuring the percentage of velocity drop from 50 million drops/nozzle to 200 million drops/nozzle. The percentage of velocity drop was measured by conventional techniques, as known in the art. The percentage of velocity drop for each of the fixer fluids is shown in Table 1.

TABLE 1

Percentage of Velocity Drop for Fixer Fluids including Dephotrope ™ CAS-MF.

| Fixer fluid formulation | 4% Vantocil ® IB (% velocity drop) | 2.5% Vantocil ® IB (% velocity drop) |
|---|---|---|
| Control | 50 | 52 |
| Fixer fluid including Dephotrope ™ CAS-MF | 4 | 3 |

The control fixer fluid had a 50-52% velocity drop from 50 million drops/nozzle to 200 million drops/nozzle, depending on the concentration of Vantocil® IB used in the fixer fluid. In contrast, the fixer fluid formulations having 0.5% Dephotrope™ CAS-MF had a 3-4% velocity drop from 50 million drops/nozzle to 200 million drops/nozzle, depending on the concentration of Vantocil® IB used. The fixer fluids including 0.5% Dephotrope™ CAS-MF showed a large decrease in the percentage of velocity drop, signifying a significant improvement in kogation performance.

Example 2

Kogation Performance of Fixer Fluids Including ESI-Terge® 320, ESI-Terge® 330, and Dephotrope™ CAS-MF Three fixer fluids, each including a phosphate ester surfactant, were evaluated for their efficacy in reducing kogation. In addition to the phosphate ester surfactant, the fixer fluids also included 4% of a cationic polymer, 8% of a polyhydric alcohol, 8% sulfolane, less than 1% of a nonionic surfactant, and less than 1% of a fluorosurfactant. A control fixer fluid, Formulation 1749, which contained no phosphate ester surfactant, was also prepared. The phosphate ester surfactants included ESI-Terge® 320, ESI-Terge® 330, and bephotrope™ CAS-MF. Formulation 1750 included 0.5% ESI-Terge® 320, Formulation 1751 included 0.5% ESI-Terge® 330, and Formulation 1752 included 0.5% Dephotrope™ CAS-MF. The fixer fluids all included a polyguanidine compound as the cationic polymer.

Drop velocities and 100× optical images of resistor surfaces were determined for each of the fixer fluids at 0, 1 million drops/nozzle, 100 million drops/nozzle, 200 million drops/nozzle, and 400 million drops/nozzle. The drop velocities for each of the fixer fluids were determined by techniques known in the art. The drop velocity was measured for an average of three pens per ink for each of the fixer fluids. FIG. 1 shows the drop velocity for the fixer fluid formulations. The drop velocities were measured in pens that correspond to the No. 11 printhead, available from Hewlett-Packard Co. FIGS. 2-5 show 100× optical images of resistor surfaces for the four fixer fluid formulations after kogation testing on the resistor life tester ("RLT").

Figure 2:
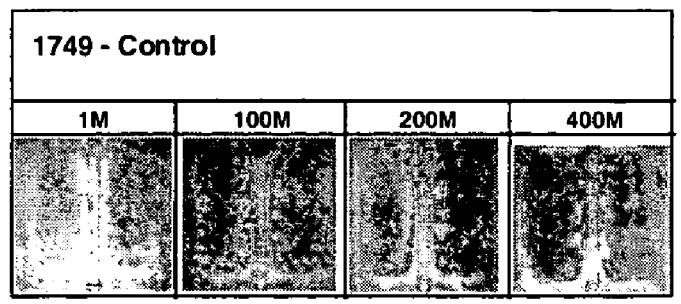
Figure 3:
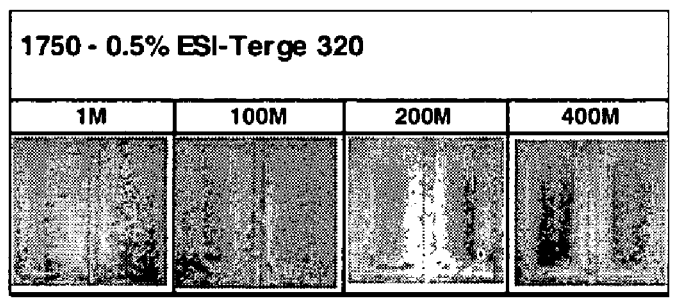
Figure 4:
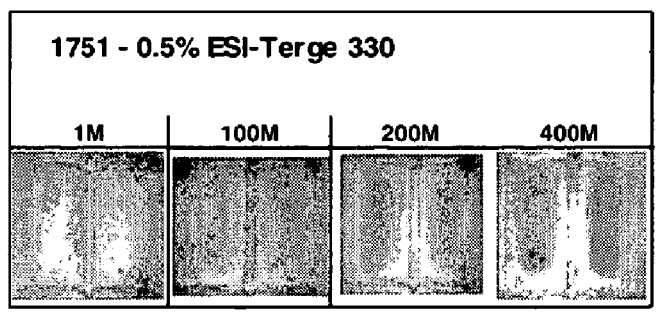
Figure 5:
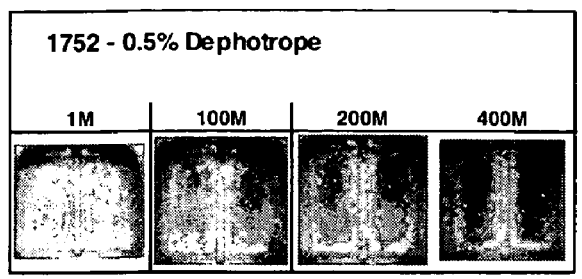

As shown in FIGS. 1 and 2, the control fixer fluid showed marginal kogation performance. A significant decrease in the drop velocity was observed over the course of firing 400 million drops/nozzle. The control fixer fluid showed a decreased drop velocity that occurred before approximately 100 million drops/nozzle. The drop velocity remained low and noisy, as evidenced by the large variation (large standard deviation) in drop velocity among the three pens tested.

In contrast, each of Formulation 1750, Formulation 1751, and Formulation 1752 showed a significant improvement in the kogation performance. The drop velocity of these fixer fluids was much more stable and the resistor surfaces were cleaner compared to that observed with the control fixer fluid. ESI-Terge® 320 and ESI-Terge® 330 provided the best improvement in kogation performance in the fixer fluid formulations.

Example 3

Kogation Performance of Fixer Fluids Including Dephotrope™ CAS-MF, Hostaphat® LPKN, Emphos® CS1361, and Emphos® 9NP Four phosphate ester surfactants, Dephotrope™ CAS-MF, Hostaphat® LPKN, Emphos® CS1361, and Emphos® 9NP, were each formulated into a fixer fluid at 0.2% and 0.5%. Formulation 1563 included 0.2% Dephotrope™ CAS-MF, Formulation 1564 included 0.5% Dephotrope™ CAS-MF, Formulation 1565 included 0.2% Hostaphat® LPKN, Formulation 1566 included 0.5% Hostaphat® LPKN, Formulation 1577 included 0.2% Emphos® CS1361, Formulation 1578 included 0.5% Emphos® CS1361, Formulation 1579 included 0.2% Emphos® 9NP, and Formulation 1580 included 0.5% Emphos® 9NP. The fixer fluids including Hostaphat® LPKN were filtered through a 0.22 micron nylon filter before being fired on the RLT because Hostaphat® LPKN is a solid at room temperature and did not go into solution well at either 0.2% or 0.5%. A control fixer fluid, Formulation 1562, having no phosphate ester surfactant was also prepared. The fixer fluids all included a polyguanidine compound as the cationic polymer.

Figure 6:
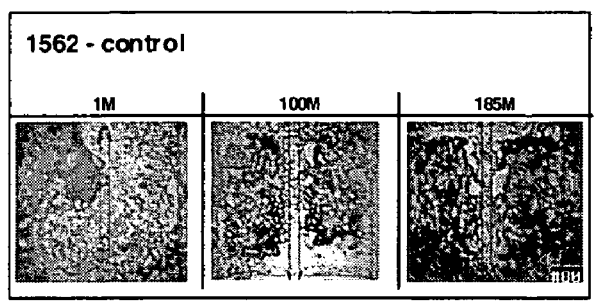
FIGS. 6-11 show improved kogation performance of one embodiment of fixer fluids of the present invention compared to the kogation performance of control fixer fluids.
Figure 7:
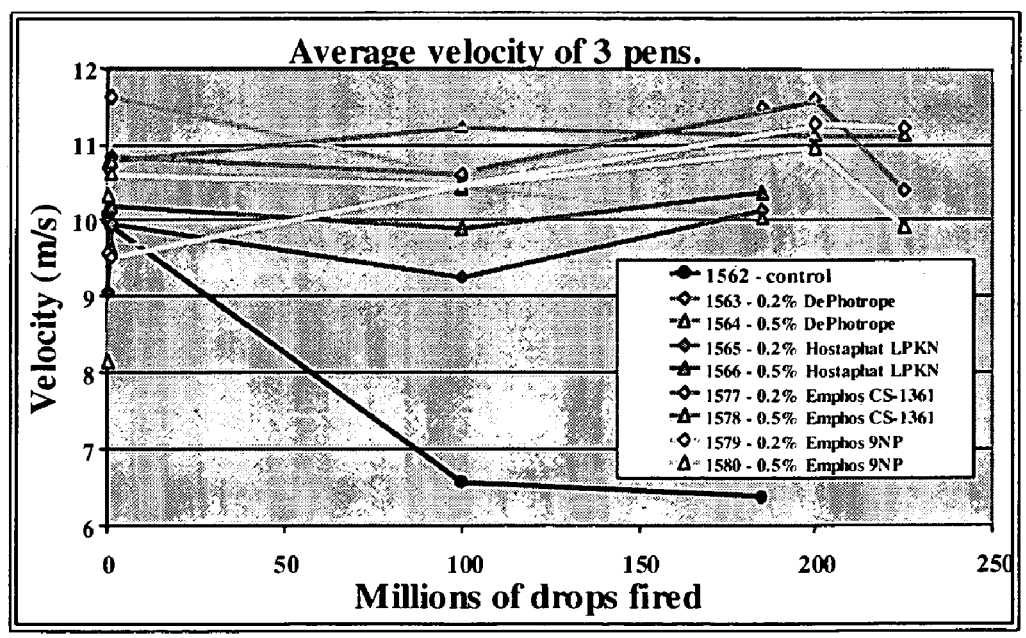
Figure 8:
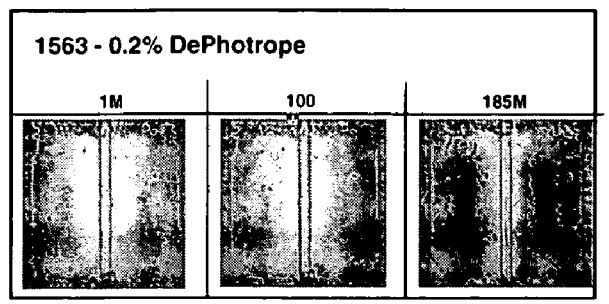
Figure 9:
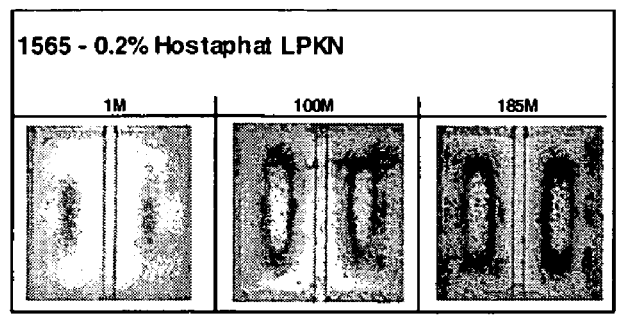
Figure 10:
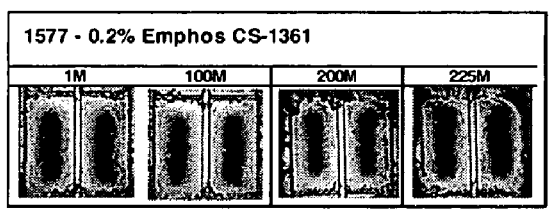
Figure 11:
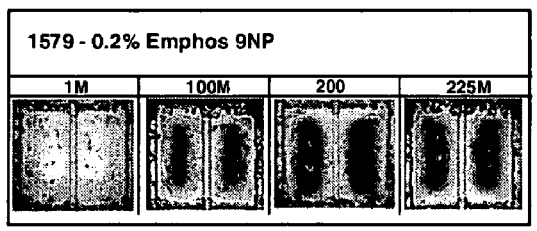

FIG. 6 shows 100× optical images of resistor surfaces for Formulation 1562 after kogation testing on the RLT. As shown in FIG. 6, the resistors were very dirty. FIG. 7 shows the average drop velocity for the fixer fluids that included the phosphate ester surfactants compared to that of the control fixer fluid. The control fixer fluid showed a dramatic decrease in the drop velocity over a small number of drops fired while the fixer fluids having the phosphate ester surfactants showed improved velocity stability.

FIGS. 6 and 8-11 show 100× optical images of the resistor surfaces after kogation testing on the RLT for the fixer fluids formulated at 0.2% surfactant concentration (Formulations 1563, 1565, 1577, and 1579). The fixer fluids having the phosphate ester surfactants showed a significant improvement in the kogation performance. The drop velocity of these fixer fluids was much more stable and the resistor surfaces were cleaner compared to that observed with the control fixer fluid. The fixer fluids having 0.5% of each of the phosphate ester surfactants showed similar improvements.

Example 4

Precipitation of Phosphate Ester Surfactants

To identify phosphate ester surfactants that did not precipitate with cationic polymers typically used in fixer fluids, fixer fluids including 5% of Vantocil® IB or Luposol™ FG were prepared. The fixer fluids had a pH of 4 or a pH of 7. To each of the fixer fluids, 2% of the phosphate ester surfactants listed in Table 2 was added. Chemical structures for each of the phosphate ester surfactants and the number of moles of EO in each of the phosphate ester surfactants are also listed in Table 2.

TABLE 2

Phosphate Ester Surfactants.

| Surfactant | Chemical Name | Moles of EO |
|---|---|---|
| Crodafos ™ N-3 Acid | oleth-3 phosphate | 3 |
| Emphos ® 9NP | nonylphenol ethoxylate phosphate ester | 9 |
| Emphos ® CS121 | nonylphenol ethoxylate phosphate ester | 4 |
| Emphos ® CS131 | nonylphenol ethoxylate phosphate ester | 6 |
| Emphos ® CS141 | nonylphenol ethoxylate phosphate ester | 10 |
| Emphos ® CS1361 | nonylphenol ethoxylate phosphate ester, sodium salt | 6 |
| Dephotrope ™ CAS-MF | 50% active organo phosphate | — |
| ESI-Terge ® 320 | phosphated nonylphenoxy polyethoxy ethanol | 11 |
| ESI-Terge ® 330 | phosphated glycol ester | — |
| Emulgen ® BL-2PK | ethyl-hexanol ethoxylated phosphate ester, potassium salt | 2 |

Each of the fixer fluids was visually observed to determine if a precipitate formed, as shown in Table 3.

TABLE 3

Precipitation of the Phosphate Ester Surfactants in the Fixer Fluids.

| Surfactant | Ionic Nature | Vantocil IB pH 4 | Vantocil IB pH 7 | Luposol FG pH 4 | Luposol FG pH 7 |
|---|---|---|---|---|---|
| Crodafos ™ N-3 Acid | Anionic | Cloudy | Cloudy | Cloudy | Cloudy |
| Emphos ® 9NP | Anionic | Clear | Clear | Clear | Clear |
| Emphos ® CS121 | Anionic | Cloudy | Cloudy | Cloudy | Cloudy |
| Emphos ® CS131 | Anionic | Clear | Clear | Cloudy | Clear |
| Emphos ® CS141 | Anionic | Clear | Clear | Clear | Clear |
| Emphos ® CS 1361 | Anionic | Clear | Clear | Cloudy | Cloudy |
| Dephotrope ™ CAS-MF | Amphoteric | Clear | Clear | Clear | Clear |

TABLE 3-continued

Precipitation of the Phosphate Ester Surfactants in the Fixer Fluids.

| Surfactant | Ionic Nature | Vantocil IB pH 4 | Vantocil IB pH 7 | Luposol FG pH 4 | Luposol FG pH 7 |
|---|---|---|---|---|---|
| ESI-Terge ® 320 | Anionic | Clear | Clear | Clear | Clear |
| ESI-Terge ® 330 | Anionic | Clear | Clear | Clear | Clear |
| Emulgen ® BL-2PK | Anionic | Cloudy | Cloudy | Cloudy | Cloudy |

Most of the phosphate ester surfactants did not precipitate in the fixer fluids, indicating that these phosphate ester surfactants were compatible with the polyguanidine compound or PEI used as the cationic polymer.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A fixer fluid having reduced kogation, comprising:
at least one phosphate ester surfactant, at least one acidic buffer, at least one cationic surfactant, and at least one cationic polymer, wherein the at least one cationic polymer comprises at least one of polyallylamine or a quaternized polyamine, wherein the at least one cationic polymer is capable of reacting with a component of an inkjet ink, and wherein the fixer fluid is formulated such that the at least one anionic phosphate ester surfactant does not precipitate with the at least one cationic polymer.

2. The fixer fluid of claim 1, wherein the at least one anionic phosphate ester surfactant is selected from the group consisting of a nonylphenol ethoxylate phosphate ester, a salt of a nonylphenol ethoxylate phosphate ester, an aliphatic phosphate ester, a phosphated nonylphenoxy polyethoxy ethanol, and a salt of ethyl-hexanol ethoxylated phosphate ester.

3. The fixer fluid of claim 1, wherein the at least one anionic phosphate ester surfactant comprises greater than or equal to 2 moles of ethylene oxide per mole of the at least one phosphate ester surfactant.

4. The fixer fluid of claim 1, wherein the at least one anionic phosphate ester surfactant is present from approximately 0.01% by weight ("wt %") to approximately 10 wt % of a total weight of the fixer fluid.

5. The fixer fluid of claim 1, wherein the at least one cationic polymer is present from approximately 0.2 wt % to approximately 10 wt % of a total weight of the fixer fluid.

6. The fixer fluid of claim 1, wherein the at least one cationic polymer further comprises at least one of a polyethylene imine compound, a polymer of hexamethylene guanide, a polymer of hexamethylene biguanide, or mixtures thereof.

7. The fixer fluid of claim 1, wherein the at least one cationic polymer further comprises at least one polyguanidine compound.

8. The fixer fluid of claim 1, wherein the at least one acidic buffer comprises succinic acid.

9. A fixer fluid having reduced kogation, comprising:
at least one cationic polymer, at least one acidic buffer, at least one cationic surfactant, and at least one phosphate ester surfactant, wherein the at least one phosphate ester surfactant is selected from the group consisting of a nonylphenol ethoxylate phosphate ester, a salt of a nonylphenol ethoxylate phosphate ester, a phosphated nonylphenoxy polyethoxy ethanol, and a salt of ethyl-hexanol ethoxylated phosphate ester.

10. The fixer fluid of claim 9, wherein the at least one phosphate ester surfactant comprises greater than or equal to approximately 2 moles of ethylene oxide per mole of the at least one phosphate ester surfactant.

11. A method of producing a fixer fluid having reduced kogation, comprising:
combining at least one anionic phosphate ester surfactant, at least one acidic buffer, at least one cationic surfactant, and at least one cationic polymer, wherein the at least one anionic phosphate ester surfactant does not precipitate with the at least one cationic polymer, wherein the at least one cationic polymer comprises at least one of polyallylamine or a quaternized polyamine, and wherein the at least one cationic polymer is capable of reacting with a component of an inkjet ink, and.

12. The method of claim 11, wherein combining at least one phosphate ester surfactant and at least one cationic polymer comprises combining at least one phosphate ester surfactant selected from the group consisting of a nonylphenol ethoxylate phosphate ester, a salt of a nonylphenol ethoxylate phosphate ester, an aliphatic phosphate ester, a phosphated nonylphenoxy polyethoxy ethanol, and a salt of ethyl-hexanol ethoxylated phosphate ester and the at least one cationic polymer.

13. The method of claim 11, wherein combining at least one phosphate ester surfactant and at least one cationic polymer comprises combining at least one phosphate ester surfactant having greater than or equal to approximately 2 moles of ethylene oxide per mole of the at least one phosphate ester surfactant and the at least one cationic polymer.

14. A fixer fluid having reduced kogation, comprising:
at least one phosphate ester surfactant, at least one acidic buffer, at least one cationic surfactant, and at least one cationic polymer, wherein the at least one cationic polymer comprises at least one of polyallylamine or a quaternized polyamine, wherein the fixer fluid is formulated such that the at least one phosphate ester surfactant does not precipitate with the at least one cationic polymer and the at least one phosphate ester surfactant is selected from the group consisting of a nonylphenol ethoxylate phosphate ester, a salt of a nonylphenol ethoxylate phosphate ester, a phosphated nonylphenoxy polyethoxy ethanol, organo phosphate, and a salt of ethyl-hexanol ethoxylated phosphate ester.

15. The fixer fluid of claim 14, wherein the at least one phosphate ester surfactant is present from approximately 0.01% by weight ("wt %") to approximately 10 wt % of a total weight of the fixer fluid.

16. The fixer fluid of claim 14, wherein the at least one cationic polymer is present from approximately 0.2 wt % to approximately 10 wt % of a total weight of the fixer fluid.

17. The fixer fluid of claim 14, wherein the at least one cationic polymer further comprises at least one of a polyethylene imine compound, a polymer of hexamethylene guanide, a polymer of hexamethylene biguanide, or mixtures thereof.

18. The fixer fluid of claim 14, wherein the at least one cationic polymer further comprises at least one polyguanidine compound.

* * * * *

UNITED STATES PATENT AND TRADEMARK OFFICE
CERTIFICATE OF CORRECTION

PATENT NO. : 7,388,040 B2 Page 1 of 1
APPLICATION NO. : 10/820612
DATED : June 17, 2008
INVENTOR(S) : Richard A. Sader et al.

It is certified that error appears in the above-identified patent and that said Letters Patent is hereby corrected as shown below:

In column 4, lines 24-25, delete "DeSophoS™" and insert -- DeSophos™ --, therefor.

In column 4, line 39, delete "DePhoS™" and insert -- DePhos™ --, therefor.

In column 4, line 40, delete "DeSophoS™" and insert -- DeSophos™ --, therefor.

In column 4, line 41, delete "DeSophoS™ 8DNP, DeSophoS™" and
insert -- DeSophos™ 8DNP, DeSophos™ --, therefor.

In column 4, line 42, delete "DeSophoS™ 10TP, DeSophoS™ 14DNP, DeSophoS™"
and insert -- DeSophos™ 10TP, DeSophos™ 14DNP, DeSophos™ --, therefor.

In column 5, line 20, delete "LupOSOI™" and insert -- Luposol™ --, therefor.

In column 8, lines 39-40, delete "bephotrope™" and insert -- Dephotrope™ --, therefor.

In column 11, line 31, in Claim 1, after "one" insert -- anionic --.

In column 12, line 26, in Claim 10, delete "approximately" before "2 moles".

In column 12, line 38, in Claim 11, after "inkjet ink" delete ", and".

Signed and Sealed this

Fifteenth Day of June, 2010

David J. Kappos
*Director of the United States Patent and Trademark Office*